United States Patent [19]

Negwer

[11] Patent Number: 5,599,109
[45] Date of Patent: Feb. 4, 1997

[54] BEARING ASSEMBLY WITH CERAMIC BEARING FACES

[75] Inventor: Bernd Negwer, Andernach, Germany

[73] Assignee: Renk, Aktiengesellschaft, Augsburg, Germany

[21] Appl. No.: 574,658

[22] Filed: Dec. 19, 1995

[30] Foreign Application Priority Data

Dec. 21, 1994 [DE] Germany .......................... 44 45 660.3
Jul. 20, 1995 [DE] Germany ........................ 195 26 497.5

[51] Int. Cl.⁶ .............. F16C 17/10; F16C 43/02
[52] U.S. Cl. ............ 384/308; 29/898.02; 384/303; 384/312; 384/907.1
[58] Field of Search .................. 384/122, 117, 384/303, 306, 308, 309, 310, 312, 907.1; 29/898.02, 898.041, 898.15

[56] References Cited

U.S. PATENT DOCUMENTS

| | | | |
|---|---|---|---|
| 2,874,007 | 2/1959 | Cametti et al. | 384/308 |
| 2,936,197 | 5/1960 | Weiler | 384/117 |
| 3,048,456 | 8/1962 | Gruber | 384/303 |
| 4,099,799 | 7/1978 | Etsion | 384/12 |
| 4,410,285 | 10/1983 | Strasser et al. | 384/907.1 X |
| 4,913,563 | 4/1990 | Veronesi et al. | 384/312 |
| 4,935,313 | 6/1990 | Knapp | 428/698 |

FOREIGN PATENT DOCUMENTS

| | | |
|---|---|---|
| 1965496 | 8/1967 | Germany . |
| 1775930 | 2/1972 | Germany . |
| 92355 | 9/1972 | Germany . |
| 2929510 | 5/1982 | Germany . |
| 3435821 | 5/1985 | Germany . |
| 3520560 | 12/1986 | Germany . |
| 3522037 | 1/1987 | Germany . |
| 3602132 | 7/1987 | Germany . |
| 3812266 | 8/1989 | Germany . |
| 9112053 | 2/1992 | Germany . |
| 61-140615 | 6/1986 | Japan . |
| 5226121 | 8/1993 | Japan ................... 384/117 |

OTHER PUBLICATIONS

Klaffke, D. et al. "Biegeproben", Tribologie & Schmierungstecfinik Jan., 1992 pp. 16–24.

Findeisen, F. "Friction Bearings" TR No. 51 9 Dec. 1975 vol. 67 p. 5.

*Primary Examiner*—Thomas R. Hannon
*Attorney, Agent, or Firm*—Natter & Natter

[57] ABSTRACT

A bearing assembly includes a bearing base and a plurality of tiltable shoes. A ceramic plate is bonded to each shoe and a face surface of each ceramic plate provides a bearing face. Tilting movement of the shoes relative to the bearing base provides a fluid lubrication film wedge between the bearing faces and the running surface of a moving load. The ceramic plates are separately produced and are bonded to the surface of the shoes, which are formed of relatively soft material, by adhesive, soldering, welding or sintering. The running surface of the load may be formed of a ceramic layer. The ceramic plates are formed of silicon carbide which is fiber reinforced.

20 Claims, 1 Drawing Sheet

BEARING ASSEMBLY WITH CERAMIC BEARING FACES

BACKGROUND OF THE INVENTION

1. Field of the Invention

This invention relates generally to oil lubricated bearings and more particularly to bearing assemblies having a plurality of tiltable shoes with ceramic bearing surfaces.

2. Background History

Oil lubricated bearings carrying a plurality of displaceable or tiltable shoes, the surfaces of which constitute bearing faces, have been utilized for specified applications. Limited movement of the shoes relative to a bearing housing facilitated the establishment of oil lubrication film wedges between the bearing face of each shoe and the running surface of a load which moved relative to the shoes.

An example of a thrust bearing with tiltable shoes is disclosed in commonly owned application, U.S. Ser. No. 08/360,223, filed Dec. 20, 1994 and incorporated herein by reference. Radial or journal bearings with arcuate shaped tiltable shoes arranged to facilitate the formation of oil film wedges between bearing faces and running load surfaces were disclosed in *Friction Bearings*, F. Findeisen, Journal TR No. 51, 9 Dec. 1975, Volume 67, Pg 5.

The employment of ceramic clad bearing faces was disclosed in German Patent DE 3,602,132 which illustrated a bearing having a base of steel, copper, or copper alloy and a ceramic bearing face containing fibers. The ceramic face was spray deposited by a cathode sputtering process. Activated lead was spray deposited to the base by a cathode sputtering process prior to spraying the ceramic layer.

The requirement for a special substrate of activated lead in German Patent DE 3,602,132 rendered the manufacture of such bearings time consuming and of considerable expense. Manufacture of the bearing was subject to potential damage or deformation of the underlying structure by tools or elevated temperatures during the formation of the ceramic layer. Further, the spray depositing of the ceramic face was a complex procedure which required specialized equipment.

A need was perceived for an improved bearing assembly which would provide the benefits associated with ceramic bearing faces at a lower cost.

SUMMARY OF THE INVENTION

A bearing assembly includes tiltable shoes having ceramic plates which are bonded to the shoes. The exposed face surface of each plate constitutes a bearing face. Mating running surfaces of the moving load may be coated with a ceramic layer. Fluidic film lubrication wedges are formed between the bearing face surfaces and the running surfaces.

The ceramic plates may be separately mass produced by conventional fabrication techniques. Selected plates are bonded to the surface of the shoes without requiring specialized coatings or treatment of the shoe surface prior to bonding. The shoes are formed of relatively soft material and the ceramic plates are bonded to an untreated surface of each shoe. Bonding may be accomplished by an adhesive or by soldering, e.g. with indium based solder, by welding or by sintering.

The bearing assembly may be utilized in any conventional bearing load configuration, e.g. a thrust bearing, a journal bearing, a combined journal-thrust bearings, etc.

A mating ceramic layer may be provided on the running surface of the load. This layer also comprises a ceramic plate which is adhesively bonded, soldered, welded, etc. or may be screwed, riveted or sintered in place. The running surface ceramic layer may also be formed by being sprayed onto a load substrate surface by a flame or plasma spraying process or a cathode sputtering process.

From the foregoing compendium, it will be appreciated that it is a consideration of the present invention to provide a bearing assembly with ceramic bearing faces of the general character described which is not subject to the disadvantages of the background history aforementioned.

A feature of the present invention is to provide a bearing assembly with ceramic bearing faces of the general character described which is relatively low in cost.

An aspect of the present invention is to provide a bearing assembly with ceramic bearing faces of the general character described which is capable of carrying high mechanical loads, for example, ten times the load capacity of bearings without ceramic bearing surfaces, at a cost less than conventional bearings with ceramic faces.

A further consideration of the present invention is to provide a fluid lubricated bearing assembly with ceramic bearing faces of the general character described which is capable of operating at elevated temperatures, close to the highest permissible temperature of a fluid lubricant, without sustaining damage.

Another aspect of the present invention is to provide a bearing assembly with ceramic bearing faces of the general character described which is well suited to meet the conditions of heavy duty applications and harsh, e.g. chemically aggressive, environments.

A further feature of the present invention is to provide a bearing assembly with ceramic bearing faces of the general character described which is well suited for sustained operation at high running speeds.

To provide a fabrication method for a bearing assembly with ceramic bearing faces of the general character described wherein mass produced uniformly sized ceramic plates may be selected for a variety of bearing applications having different overall sizes and/or shapes is another consideration of the present invention.

A further aspect of the present invention is to provide a bearing assembly with ceramic bearing faces of the general character described having a plurality of tiltable shoes with ceramic plates bonded thereto and wherein elevated running temperatures at a ceramic plate bearing face are not readily transmitted to the shoes and bearing assembly.

To provide a bearing assembly with ceramic bearing faces of the general character described wherein ceramic plates having bearing faces are intimately bonded to tiltable shoes is a further consideration of the present invention.

Yet another feature of the present invention is to provide a bearing assembly with ceramic bearing faces of the general character described wherein specialized surface treatments are not required for surfaces underlying the ceramic faces.

Other aspects, features and considerations of the present invention in part will be obvious and in part will be pointed out hereinafter.

With these ends in view, the invention finds embodiment in the various combinations of elements, arrangements of parts and series of steps by which the said aspects, features and considerations and certain other aspects, features and considerations are attained, all with reference to the accompanying drawings, the scope of which will be more particularly pointed out and indicated in the appended claims.

BRIEF DESCRIPTION OF THE DRAWINGS

In the accompanying drawings in which is shown one of the various possible exemplary embodiments of the invention.

DESCRIPTION OF THE PREFERRED EMBODIMENT

Figure 1:
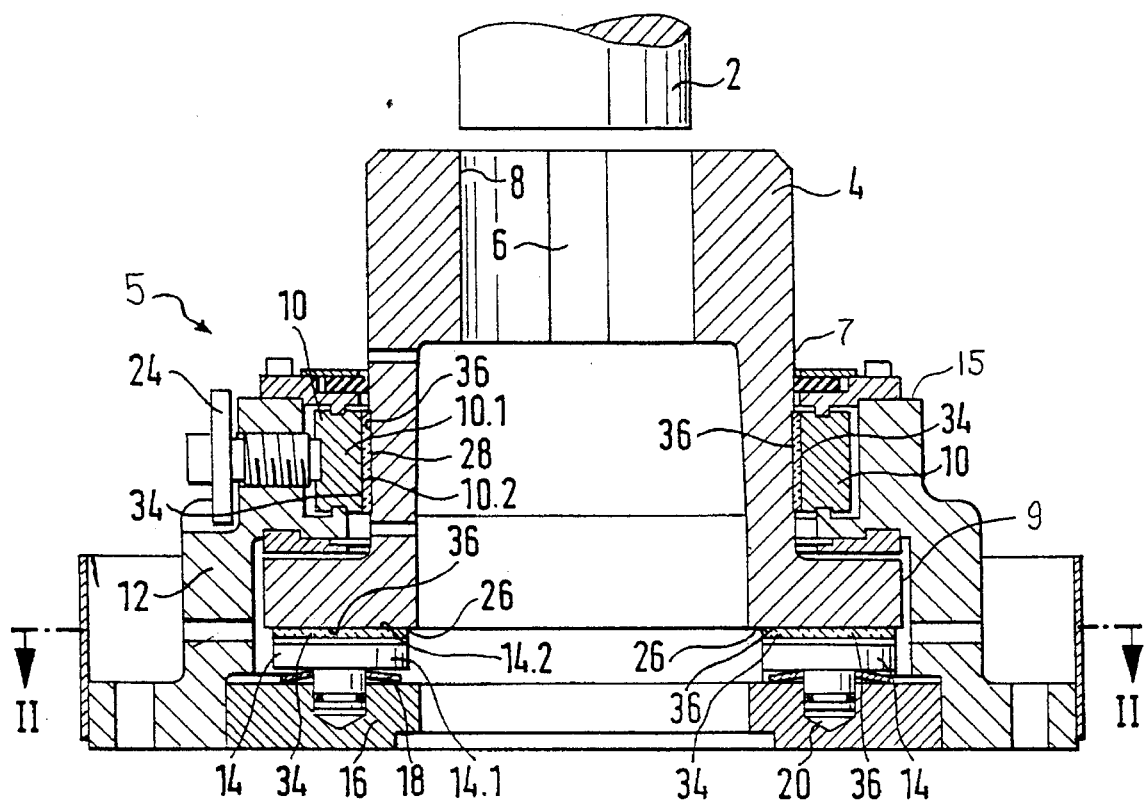
FIG. 1 is a longitudinal sectional view through a combined journal-thrust bearing constructed in accordance with and embodying the invention and showing a plurality of tiltable shoes, each carrying a fiber reinforced ceramic plate bonded thereto.

Referring now in detail to the drawings, there is shown generally a bearing assembly 5 with ceramic bearing faces constructed in accordance with and embodying the invention, supporting a rotating shaft 2 against displacement in both radial and an axial directions.

The bearing assembly 5 comprises a stepped cylindrical housing 12 having an upper cylindrical journal collar 15. Within a bore of the journal collar 15, a plurality of equidistantly spaced tiltable journal shoes 10 are received.

A radial base flange of the stepped housing 12 receives a cylindrical thrust ring 16 which carries a plurality of equidistantly spaced tiltable thrust shoes 14.

The end of the rotating load shaft 2 is received within a shaft socket 4 having an axial cylindrical bore 8. The shaft 2 and socket 4 rotate unitarily without slippage and are unitarily displaceable in an axial direction without slippage. For such purpose, a relatively tight shrink interference fit may be employed between the shaft 2 and the bore 8. Alternately, a snug fit may be employed between the shaft 2 and the bore 8, augmented by a key or spring clip which is received in an axial groove 6 of the bore 8. Such alternate arrangement will permit on site disassembly.

The shaft socket 4 includes a cylindrical body 7 and a radial end flange 9, both of which are received within the bearing assembly 5.

The shaft socket 4, hence the shaft 2, is supported for rotation about its axis by the journal collar 15, and more specifically, the tiltable journal shoes 10 which are cylindrically curved in transverse horizontal cross section as viewed in FIG. 1 to conform with the cylindrical surface of the socket body 7.

In a known manner, the tiltable journal shoes 10 pivot or rock about an adjustably fixed radial pivot comprising the inner end of a threaded shaft which extends through a radially threaded bore in the journal collar 15. The pivot point may be adjustably fixed through rotation of a thumb wheel 24. In response to rotation of the shaft 2 in a lubricating oil environment, the journal shoes tilt, which enables the establishment of oil lubrication film wedges between the bearing face surfaces of the journal shoes 10 and mating running surfaces 28 of the socket body 7.

In a similar manner, the thrust ring 16 carries equidistantly spaced tiltable thrust shoes 14. Each thrust shoe 14 includes a stem which is received an axial bore 20. A cup spring 18 is positioned between an enlarged head portion of each thrust shoe 14 and the thrust ring 16 to assure appropriate engagement between a bearing face of each thrust shoe 14 and a thrust running surface 26 of the socket flange 9. Such arrangement permits tilting movement of the thrust shoe 14 and the establishment of oil lubrication film wedges between the bearing face of the thrust shoes 14 and the thrust running surface 26, in a manner well known to those of skill in the art.

It should be understood that the bearing assembly 5 includes suitable lubrication bores to facilitate the flow of a sufficient quantity of lubricating fluid around the journal shoes 10 and the mating running surface 28 of the socket body 7 and around the thrust shoes 14 and the mating running surface 26 of the socket flange 9.

It should additionally appreciated that the bearing, to the extent heretofore described, is substantially conventional in configuration and readily available and components of which are fully described in the copending commonly owned U.S. application, Ser. No. 08/360,223 filed Dec. 20, 1994 and incorporated by reference.

In accordance with the invention, ,each journal shoe 10 comprises a body 10.1, preferably formed of a relatively soft metal such as unhardened steel, e.g. C10 steel, and a plate 34 of fiber reinforced ceramic, e.g. silicon carbide, having an exposed outer bearing face 10.2.

The ceramic plate 34 is bonded to the body 10.1 by an intermediate layer of glue or suitable adhesive, by soldering, for example, with an indium based or an indium alloy solder, by welding, or by sintering. The bond forms a firm, long lasting and intimate connection between the shoe body 10.1 and the ceramic plate 34 to assure a long service life and achieve the attributes of desirable heat transfer characteristics.

Figure 2:
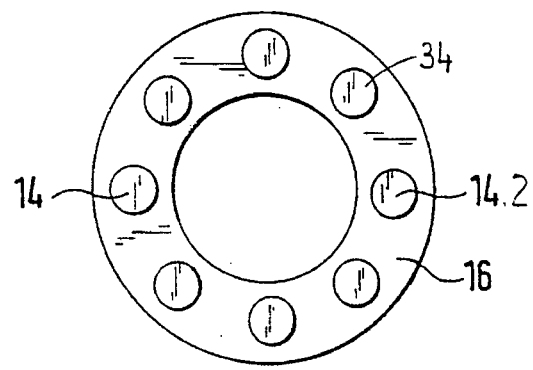
FIG. 2 is a reduced scale auxiliary view of a thrust bearing subassembly, showing a bearing ring and a plurality of equidistantly spaced tiltable shoes seated in the ring, with each shoe carrying a fiber reinforced ceramic plate bonded to its upper surface.

Similarly, each thrust shoe 14 is formed of a shoe body 14.1, the upper (as viewed in FIG. 1) exposed surface of which is covered by a ceramic plate 34. Preferably, each the thrust shoe 14 includes a body 14.1 formed of relatively soft, e.g. C10 steel, and an upper surface (as viewed in FIG. 2) covered by a ceramic plate 34 having embedded fibers. The ceramic plates 34 are secured to the upper surface of the thrust shoe bodies 14.1 in manners identical to those described with respect to the bonding of the ceramic plates 34 to the journal shoes 10.

The ceramic plates 34, comprise a ceramic material, such as silicon carbide, with fibers of glass, cotton, carbon etc., embedded therein. The plates 34 are preferably mass produced with a thickness determined by the requirements of the particular bearing load application, preferably, as thin as possible. Mass production of the ceramic plates need not include fabricating of the plates by sintering, although sintering may be utilized as one of the available mechanisms for adhering the ceramic plates 34 to the bodies of the selected shoes.

It should be noted that each of the ceramic plates 34 includes outer bearing surfaces, designated 10.2, with respect to the journal shoes 10 and designated 14.2, with respect to the thrust shoes 14. While the thrust bearing surface 14.2 is substantially flat and planar as previously mentioned, the bearing surfaces of the journal shoes 10 are preferably concave cylindrically curved about the shaft axis, to accommodate the cylindrical surface of the socket body 7. The ceramic bearing surfaces 10.2 are therefore preferably configured as a segment of a cylindrical plane, coaxial with the axis of the shaft 2 and bearing housing 12.

In accordance with the invention, the ceramic bearing surfaces 14.2, which accommodate thrust loads oppose the journal running surface 26 and the ceramic bearing surfaces 10.2 oppose the running surfaces 28. The running surfaces 26, 28 may be hardened, e.g. may be formed of hardened steel, for example or of any other material which has a low coefficient of friction and high wear resistance.

Preferably, the running surfaces 26, 28 are formed of a material different than of the socket body 7 and the end flange 9 respectively. If the running surfaces 26, 28 comprise unhardened materials such as an unhardened metal or a plastic, they would be subject to rapid wear induced from the relatively hard ceramic plates 34. On the other hand, if the running surfaces 26, 28 comprise a hardened metal such as hardened steel, there is a possibility that they may induce rapid wear of the ceramic plates. Accordingly, it has been found advantageous to form the running surfaces 26, 28 of ceramic layers 36 which may be fastened to the shaft socket 4 or spray deposited thereon.

The ceramic layers 36 may comprise a fiber reinforced ceramic which can be secured to the running surfaces 28, 26 of the socket body 7 and the end flange 9, respectively by adhesives such as glues, by indium based solders, by welding and/or sintering, etc. Further, where appropriate, the ceramic layers 36 may comprise a plate or plates which are secured, riveted or bolted to the surfaces of the shaft socket 4 or may be applied by a flame or plasma spraying process or by a cathode sputtering process.

It should be appreciated that the bearing assembly 5 may be fabricated by economical mass production techniques with an assembly procedure including the selection of appropriate ceramic plates 34 which have been previously mass produced and the mounting of such plates to the journal shoes 10 and thrust shoes 14 without the requirement for costly surface treatment of the surfaces of the shoes 10, 14 and without the requirement for costly manufacturing techniques and equipment for spray depositing ceramic layers.

Further, it should be noted that the bearing assemblies 5, constructed in accordance with the invention, are particularly well suited for sustained operation in chemically aggressive, harsh environments, such as, chemical and sewage pumps, without damage to the bearing faces and running surfaces.

Thus, it will be seen that there is provided a bearing assembly with ceramic bearing faces of the general character described which achieves the various .aspects, features and considerations of the present invention and which well suited to meet the conditions of practical use.

As various modifications might be made in the bearing assembly as above set forth without departing from the spirit of the invention, it is to be understood that all matter herein described or shown in the accompanying drawings is to be interpreted as illustrative and not in a limiting sense.

Having thus described the invention there is claimed as new and desired to be secured by Letters Patent:

1. In a lubricated bearing assembly having a bearing base and a plurality of shoes, each shoe including a bearing face, means for establishing a fluid lubrication film wedge between each bearing face and a running surface moving relative to the base, the means for establishing a fluid lubrication film wedge including means for tiltably mounting the plurality of shoes relative to the base, the improvement comprising a like plurality of ceramic plates, each plate being formed separately from the shoe, each plate having an exposed face, the exposed plate faces each comprising a bearing face and means for bonding each plate to a shoe after the plate has been formed, each plate having a hardness greater than that of its respective shoe.

2. The improvement in a lubricated bearing assembly as constructed in accordance with claim 1 wherein the means for bonding comprises an adhesive.

3. The improvement in a lubricated bearing assembly as constructed in accordance with claim 1 wherein the means for bonding comprises solder.

4. The improvement in a lubricated bearing assembly as constructed in accordance with claim 3 wherein the solder is indium based.

5. The improvement in a lubricated bearing assembly as constructed in accordance with claim 1 wherein the means for bonding comprises a weld.

6. The improvement in a lubricated bearing assembly as constructed in accordance with claim 1 wherein the means for bonding comprises a sintered bond.

7. The improvement in a lubricated bearing assembly as constructed in accordance with claim 1 wherein the ceramic plates include reinforcing fibers selected from the group consisting of carbon, glass and cotton.

8. The improvement in a lubricated bearing assembly as constructed in accordance with claim 1 wherein the ceramic plates comprise reinforced silicon carbide.

9. The improvement in a lubricated bearing assembly as constructed in accordance with claim 1 wherein each bearing face is flat planar, the bearing comprising a thrust bearing, whereby axial stability of the running surface is maintained.

10. The improvement in a lubricated bearing assembly as constructed in accordance with claim 1 wherein each bearing face comprises a concave portion of a cylindrical plane, the bearing comprising a journal bearing, whereby radial stability of the running surface is maintained.

11. The improvement in a lubricated bearing assembly as constructed in accordance with claim 1 wherein the bearing assembly comprises a combined journal-thrust bearing, selected bearing faces being flat planar, the flat planar bearing faces maintaining axial stability of the running surface, selected bearing faces comprising a concave portion of a cylindrical plane whereby radial stability of the running surface is maintained.

12. In a lubricated bearing assembly having a bearing base and a plurality of shoes, each shoe including a bearing face, the assembly further including a load having a running surface moving relative to the base, means for establishing a fluid lubrication film wedge between each bearing face and the running surface, the means for establishing a fluid lubrication film wedge including means for tiltably mounting the plurality of shoes relative to the base, the improvement comprising a like plurality of ceramic plates, each plate being formed separately from the shoe, each plate having an exposed face, the exposed plate faces each comprising a bearing face and means for attaching each plate to a shoe after the plate has been formed, each plate having a hardness greater than that of its respective shoe the running surface comprising a ceramic layer and means for carrying the ceramic layer for movement relative to the base, the ceramic layer having a hardness greater than the hardness of the means for carrying the ceramic layer.

13. The improvement in a lubricated bearing assembly as constructed in accordance with claim 12 wherein the ceramic layer is spray deposited on the means carrying the ceramic layer.

14. A method of fabricating a lubricated bearing assembly as constructed in accordance with claim 1, the method including the steps of:

(a) producing a plurality of ceramic plates, each plate having a bearing face, (b) bonding a plurality of shoes, and (c) bonding a face of each plate opposite the bearing face to a shoe.

15. A method of fabricating a lubricated bearing assembly as constructed in accordance with claim 14 wherein the step of bonding comprises applying an adhesive bond between the face of the ceramic plate opposite the bearing face and a mating surface of each shoe.

16. A method of fabricating a lubricated bearing assembly as constructed in accordance with claim 14 wherein the step of bonding comprises applying a solder bond between the face of the ceramic plate opposite the bearing face and a mating surface of each shoe.

17. A method of fabricating a lubricated bearing assembly as constructed in accordance with claim 14 wherein the step of attaching comprises applying a weld bond between the face of the ceramic plate opposite the bearing face and a mating surface of each shoe.

18. A method of fabricating a lubricated bearing assembly as constructed in accordance with claim 14 wherein the step of bonding comprises applying a sinter bond between the face of the ceramic plate opposite the bearing face and a mating surface of each shoe.

19. A method of fabricating a lubricated bearing assembly as constructed in accordance with claim 14 further including the step of:

(d) tiltably mounting each shoe to the bearing base.

20. A method of fabricating a lubricated bearing assembly as constructed in accordance with claim 14 wherein the step of producing the ceramic plates includes producing the plates from silicon carbide and a plurality of reinforcing fibers.

* * * * *